US 8,374,479 B1

(12) United States Patent
Starling

(10) Patent No.: US 8,374,479 B1
(45) Date of Patent: Feb. 12, 2013

(54) LIVE-CHASE VIDEO-DESCRIPTION BUFFER DISPLAY

(75) Inventor: Michael Irving Starling, Cambridge, MD (US)

(73) Assignee: National Public Radio, Inc., Washington, DC (US)

( * ) Notice: Subject to any disclaimer, the term of this patent is extended or adjusted under 35 U.S.C. 154(b) by 1078 days.

(21) Appl. No.: 11/934,728

(22) Filed: Nov. 2, 2007

Related U.S. Application Data

(60) Provisional application No. 60/864,158, filed on Nov. 2, 2006.

(51) Int. Cl.
*H04N 5/932* (2006.01)
(52) U.S. Cl. ........................................................ 386/201
(58) Field of Classification Search .................. 386/201; 382/114
See application file for complete search history.

(56) References Cited

U.S. PATENT DOCUMENTS

| | | | |
|---|---|---|---|
| 4,282,606 A | 8/1981 | Factor | |
| 6,184,937 B1 * | 2/2001 | Williams et al. | 348/515 |
| 6,324,337 B1 | 11/2001 | Goldwasser | |
| 2001/0037499 A1 * | 11/2001 | Turock et al. | 725/32 |
| 2002/0102969 A1 * | 8/2002 | Enns et al. | 455/414 |
| 2002/0144295 A1 * | 10/2002 | Hirata | 725/153 |
| 2003/0041332 A1 | 2/2003 | Allen et al. | |
| 2003/0048928 A1 | 3/2003 | Yavitz | |
| 2006/0013565 A1 * | 1/2006 | Baumgartner | 386/96 |
| 2007/0129020 A1 * | 6/2007 | Anton-Becker | 455/78 |
| 2011/0047496 A1 * | 2/2011 | Harrison | 715/772 |

OTHER PUBLICATIONS

"Audio Time Manager Brochure," www.25-Seven.com, 25-Seven Systems, 1085 Commonwealth Avenue, #360, Boston, MA 02215, pp. 1-2.
TiVo Viewers Guide, Series 2, TiVo Inc., 2160 Gold Street, P.O. Box 2160, Alviso, CA 95002-2160, pp. 156.

* cited by examiner

*Primary Examiner* — Thai Tran
*Assistant Examiner* — William Tran
(74) *Attorney, Agent, or Firm* — Wilmer Cutler Pickering Hale and Dorr LLP

(57) ABSTRACT

Embodiments of the invention describe a method of generating an enhanced audio stream. The enhanced audio stream is generated from live audio received and accompanies a live video broadcast. This live audio is buffered and combined with a visual description of the live video broadcast. Together these form an enhanced audio stream. The visual description is entered by a visual describer while they are viewing a an instantaneously updated visual buffer size display. The visual buffer size display is calibrated to a pre-set maximum buffer size, and shows the pre-set maximum buffer size and the current buffer size in a visual manner. Further, live audio from the buffer that is inserted into the enhanced audio stream is compressed in time.

30 Claims, 13 Drawing Sheets

LIVE-CHASE VIDEO-DESCRIPTION BUFFER DISPLAY

CROSS-REFERENCE TO RELATED APPLICATIONS

This application claims the benefit under 35 U.S.C. 119(e) of U.S. Provisional Patent Application No. 60/864,158, filed on Nov. 2, 2006 entitled "Live-Chase Video-Description Buffer Display", which is hereby incorporated by reference herein in its entirety

BACKGROUND OF THE INVENTION

1. Field of the Invention

The invention relates to methods and systems for assisting live visual describers, more specifically to system and methods for instantaneous display of catch up buffer status through a visual display.

2. Description of the Related Art

There are a large number of visually impaired individuals in the United States, many of these visually impaired individually are legally blind. Further, the number of visually impaired individuals is expected to grow as the population ages. Therefore, addressing the needs of this population is ever more important.

One important source of information and entertainment for visually impaired individuals is radio. One example of radio broadcasts is those from public radio stations such as National Public Radio (NPR), which has a weekly audience of over 26 million people. More than 99 percent of the American population lives in an area serviced by an NPR member station.

Public radio has also had an important role in the nation's emergency response system. Broadcast radio serves as a lifeline of communications during times of emergencies, especially when the power grid is down. FEMA routinely advises the public to make sure they have radios with batteries on hand when major storms approach. Many, if not most radio stations have backup generators at studios and transmitters, and many also maintain dedicated links to local Emergency Operations Centers.

The nation's Primary Entry Point system (PEP) is the backbone of the Emergency Alerting System, established subsequent to President Truman's creation of the CONELRAD system in 1951. Thirty four Primary Entry Point AM broadcast stations were designated early on by FEMA to carry presidential messages in times of national emergencies. The PEP stations are provided with hardened facilities and secure telephone links from FEMA. NPR, on a voluntary public service basis, continuously monitors the PEP system and passes all national messages directly to the over 800 stations that receive programming through the Public Radio Satellite System. The NPR system is tested weekly and staffed 7/24.

Starting in Minneapolis in 1969, radio reading services for the blind began operating using analog FM subcarriers across the nation to read current books, newspapers, and magazines to those with print handicaps. Today over 100 reading services are in continuous operation and several reading service programs are distributed for use on other reading services through the Public Radio Satellite System. Congress has established a copyright exemption for the reading of such information to the print handicapped. It is estimated that nearly a million FM subcarrier radios have been distributed to users in the ensuing years.

One radio service assisting the visually impaired is the San Diego Radio Information Service, which commenced in the late 1970's, and which described broadcasts synchronized with the annual Rose Parade broadcast on CBS television. Blind consumers in reading service areas could enjoy the broadcast along with sighted family members by turning the TV sound down and turning up the local radio reading service carrying the described feed. The description would be provided by live visual describers who described the events verbally. This has been useful not only for people to view broadcasts like the Rose parade, but also for people viewing theatre, television, or visiting a museum or art gallery. In all these situations, the visual content is being is described for a listener by a visual describer.

SUMMARY OF THE INVENTION

Embodiments of the invention describe a method of generating an enhanced audio stream. The method comprises receiving live audio accompanying a live video broadcast and buffering the live audio in a buffer. The method further comprises (i) inserting into the enhanced audio stream at least a portion of the live audio; (ii) inserting into the enhanced audio stream at least one visual description of the video broadcast while simultaneously displaying an instantaneously updated visual buffer size display, wherein the visual buffer size display is calibrated to a pre-set maximum buffer size, and wherein the visual buffer size display shows the pre-set maximum buffer size and the current buffer size in a visual manner; (iii) and inserting into the enhanced audio stream, live audio from the buffer, wherein the live audio is compressed in time.

Embodiments of the invention include a method where the live video broadcast relates to a public emergency situation. Embodiments of the invention also include a method where the visual buffer size display has a pre-set maximum buffer size set to 60 seconds, where the current buffer size is visually displayed through a numeric display, or where a warning is displayed when the current buffer size is greater that the pre-set maximum buffer size.

Embodiments of the invention can also be used along with digital radio broadcasts, or as an additional or alternate audio stream accompanying a live video broadcast.

In other embodiments of the invention, the invention can be implemented within a system having an audio input for receiving live audio accompanying a live video broadcast, a memory buffer for storing the live audio, and a microprocessor executing instructions for inserting into a memory location storing an enhanced audio stream, at least a portion of the live audio, and instructions for inserting into the memory location storing an enhanced audio stream at least one visual description of the video broadcast. The system also includes an output display showing an instantaneously updated visual buffer size display, wherein the visual buffer size display is calibrated to a pre-set maximum buffer size, and wherein the visual buffer display shows the pre-set maximum buffer size and the current buffer size in a visual manner. The system further includes a microprocessor executing instructions for storing at the memory location of the enhanced audio stream, live audio from the buffer, wherein the live audio is compressed in time.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF EMBODIMENTS OF THE INVENTION

Figure 1:
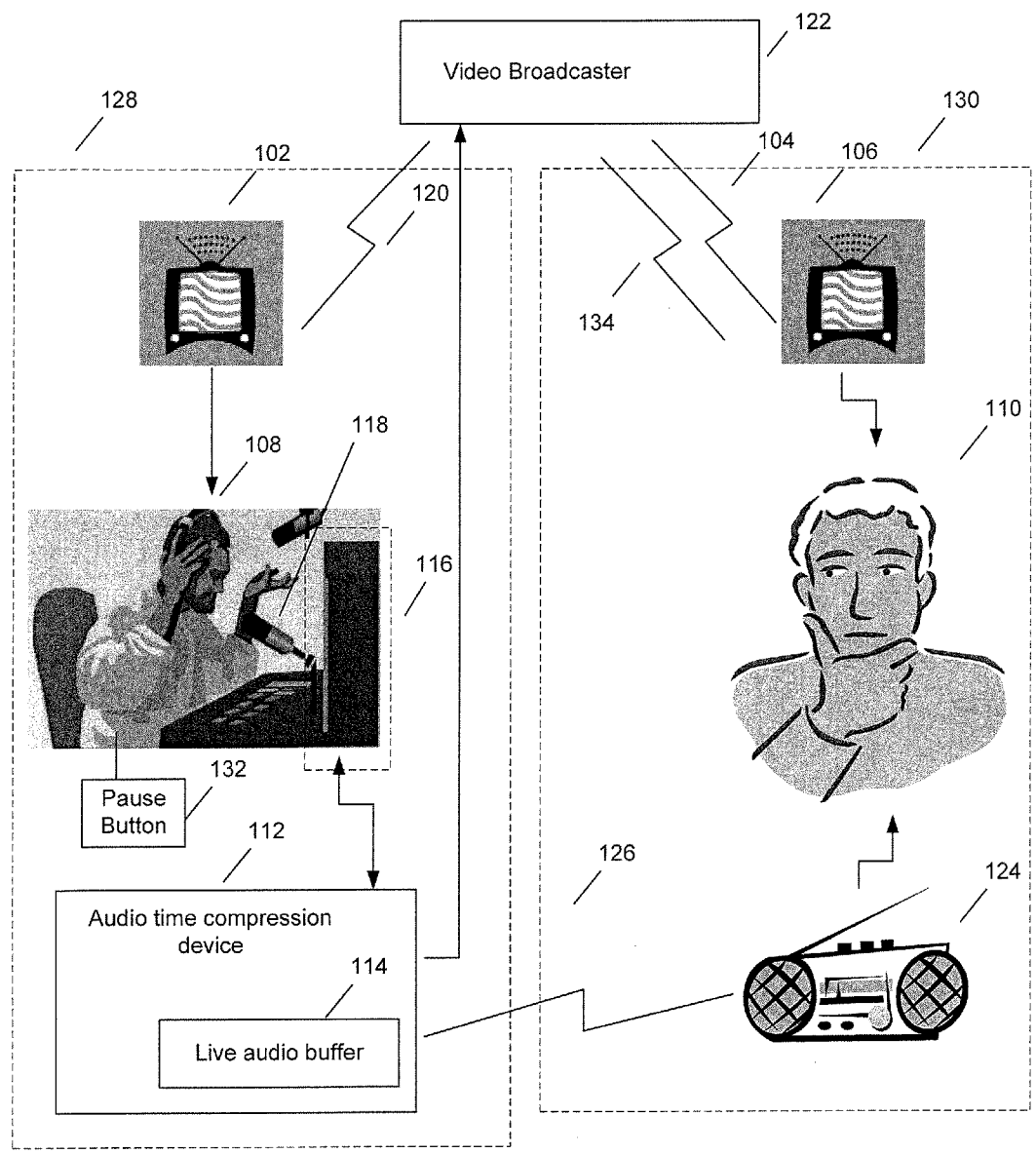
FIG. 1 shows an overall system diagram of a system used by a visual describer.

Embodiments of the invention provide instantaneous display of the status of a live audio buffer when where visual description is being inserted. The display shows how many seconds behind live time the visual description is being inserted. This display aids a visual describer in controlling and minimizing "live event" vs. "described visual feed" temporal difference. Embodiments of the invention can be used with audio time compression devices to permit live non-destructive visual content narrative additions to an existing audio stream. This is especially important for visually impaired individuals during emergencies, where understanding complex instructions and visually presented information may be critical for the individual's safety. The LC-VD BD helps ensure that individuals timely receive additional visual description, and that such description does not unduly potentially slip far behind "real time" (live time) causing them to miss other timely instructions or information in the original broadcast.

In one embodiment of the invention, a visual describer adds visual description to live televised coverage of an emergency. The visual describer pauses the live audio, and allows it to be buffered in a live audio buffer, while inserting descriptive annotations. During these annotations, the visual describer system can continuously monitor and instantaneously display the "seconds behind live" using the LC-VD BD. This helps the visual describer to stay within guidelines for how much the live event audio can be delayed. The live audio buffer continuously chases back to real time by playing audio at an increased speed through a variety of software based audio time compression methods. In some embodiments, this new enhanced audio stream is provided over specialized radio or other audio channels intended for reception by the visually impaired, in a synchronized manner with instantaneous live emergency video broadcasts, while during the description and pause process it is used to replace the audio stream of the broadcast video feed itself.

This real time enhanced audio stream with visual description would be a great improvement to traditional descriptive visual techniques, which typically rely on well-rehearsed timings and cues for least disruptive impact on the flow of the visual event. Live events by their nature do not lend themselves to predictable pauses in information flow. Particularly during emergencies, a visual describer knowing the maximum on-the-scene information that can be transmitted without deletion, and which can be added for affected users to effectively comprehend the nature of the event (e.g., visually impaired) without any undue delay in potentially critical emergency instructions would be a significant improvement in utility of information flow.

All telecommunications are migrating to digital transmissions. Radio broadcasting, the original wireless medium, is no exception. Although radio is the last electronic mass medium to be making the conversion to digital transmission, the conversion is well underway with HD Radio signals on-the-air in virtually every major market in the United States.

HD Radio, the only FCC endorsed digital radio broadcast system being deployed in America, introduces a flexible service model supporting the expansion and improvement of radio's public service offerings. Multiple program channels from a single radio station, improved sound quality matching CD audio quality, and the addition of text, time-shifting, and targeted content are existing or emerging features of the growing number of HD Radio stations.

These features and advantages of digital radio, including multiple program channels, can be take advantage of, especially during emergencies. As a visually impaired viewer is obtaining information or instruction about an emergency for a video broadcast (like broadcast television), they can also receive an enhanced audio stream containing visual description for the video broadcast.

FIG. 1 shows an overall system diagram of a system used by a visual describer. A video broadcaster 122 is broadcasting an event (e.g. emergency event) to both an individual (e.g. a visually impaired person) and a visual describer 108 (through televisions 106 and 102, respectively). The visual describer 108, using his visual describer system (microphone 118, computer system 116, audio time compression device (with live audio buffer 114), and pause button 132) is able to insert visual description audio to the live event audio, and provide an enhanced audio stream to the listener through the communication link 126 and radio 124. Alternatively, the enhanced audio stream can be provided as a substitute for the audio stream of video broadcast.

In detail, video broadcaster 122 can be broadcasting content such as emergency news coverage, or an important message from a government official. This video content may be live content, where immediate action may be required by a viewer. The video broadcast can be delivered over the air, through cable, satellite, fiber, or any other video delivery means to both an individual 110 through communication link 104, and visual describer 108, through communication link 120.

The visual describer 108 receives the video broadcast using a television 102, television enabled computer, or other system capable of displaying and processing the video broadcast. The visual describer is located at first site 128. The audio stream from television 102 is forwarded to the visual describer system and audio time compression device 112 for further procession and combining with visual description inserted by visual describer.

While viewing the live video broadcast, the visual describer in real time adds visual description. This can be done through the visual describer's system, which includes a microphone 118 for recording audio, and a computer system 116. This computer system has a display screen upon which the LC-VD BD can be displayed for the visual describer, as further described with respect to FIG. 2A.

The computer can be a dedicated digital audio rendering system within an industrial grade dedicated computing device. The system should contain sufficient audio processing power to manipulate temporal and spectral functions of the live audio buffer, with minimal processing latency to avoid output streaming pauses that would be distracting to listeners to the visually described event. Computer system 116 can also be a standard computer system with sufficient computing and audio input/output capabilities or an embedded computing process within a specially designed standalone buffer and audio compression device.

The computer system 116 is also connected to an audio time compression device 112 which has a live audio buffer 114. Alternatively, the audio time compression device can be incorporated into a computer system using either hardware, software, or a combination of both. It may be a specialized computing board, or a software application capable of compressing a digital representation of the live audio. The audio time compression device is responsible for receiving and buffering the live audio, and for playing back the buffered live audio at an increased speed using time domain and frequency techniques to maintain relative pitch and maintain perceived audio transparency. There are many known methods of increasing the playback speed of buffered live audio. These methods include variable speed constant temporal pitch methods, removing of spaces between words, shortening vowels, and removing words.

The computer 116 is also connected to pause button 132, which allows visual describer to pause the transmission of live audio, or audio from live audio buffer 114, and insert live visual description of the live video broadcast. Pause button can be a separate device or box with a button to cause live audio to be buffered and visual descriptions to be transmitted. Pause button 132 can also activate microphone 118. Alternatively, pause button can be integrated into the keyboard or mouse of computer system 116.

Live audio buffer 114 is used to buffer live audio that accompanies a video broadcast. This audio is stored in a buffer while additional visual description is being added. In this way visual description can be added without having to remove any content from the audio stream to the listener. Live buffer can be a digital memory storing converted (from analog to digital as appropriate, depending on the video source) audio.

Listener 110 is also viewing video broadcast from video broadcaster 122 as received over communication link 104. Listener 110 is located at a second, remote, site 130. Similar to visual describer 108, listener 110 is viewing the video broadcast on television 106 (or other capable video reception device), but because individual may be visually impaired, or simply not viewing the screen, they are listening to the enhanced audio stream on radio 124. Radio 124 can be a regular analog FM or AM radio, or subcarrier channel, or alternatively, a digital radio capable of receiving digital radio signals with the potential for specialized digital audio multicast channel reception, or alternatively through any wired or wireless audio communications device or circuits. The enhanced audio stream is delivered from the visual describer and site 128 to individual's site 130 over communications link 126.

The enhanced audio stream is provided in a synchronized manner, for example live at the same time as a live new story, and contains both the original audio stream (which may be increased in speed) and visual description added by visual describer 108. Alternatively, the enhanced audio stream from visual describer may be provided to video broadcaster 122 for transmission along with video broadcast on link 104, for example, as an additional alternative audio channel 134 accompanying the video transmission on link 104. The enhanced audio stream can be provided over any type of standard communication link back to video broadcaster.

Figure 2A:
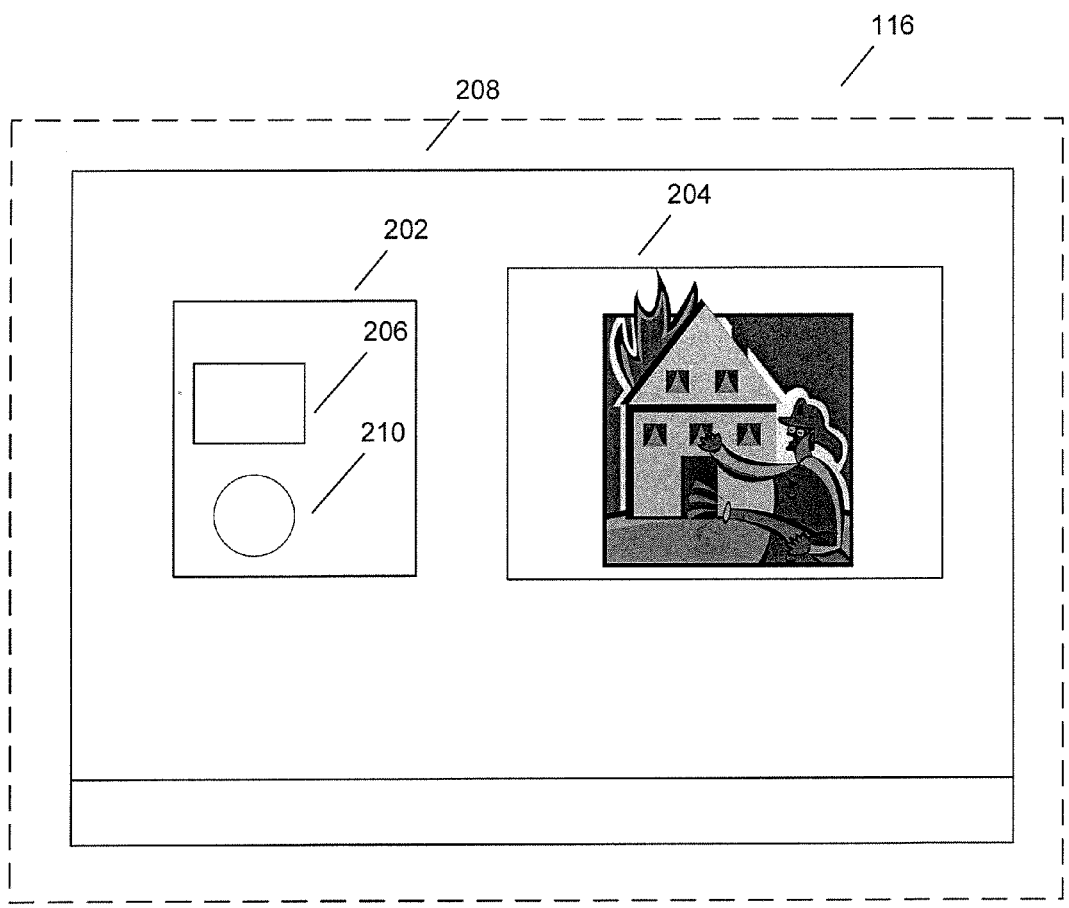
FIG. 2A shows a more detailed view of the display used by a visual describer in one embodiment of the invention.

FIG. 2A shows a more detailed view of the display used by a visual describer in one embodiment of the invention. The display 208 of computer system 116 shows the desktop of a standard operating system (e.g. Microsoft Windows). The desktop has a window 204 for the video broadcast, and a window 202 for an application to assist visual describer, including display of LC-VD BD 206.

In detail, this embodiment shows that video broadcast is being received by computer system 116, and is being displayed on a display 208, which can be a standard computer monitor. Within the display 208 is shown the desktop of a standard operating system with multiple application windows. In contrast to television 102 of FIG. 1, one application window 204 within the desktop shows the video broadcast from video broadcaster 122. This application can be programmed using standard tools and technologies available on the operating system platform (e.g. C++, Windows API, Java), or be purchased from commercial vendors.

Within the same desktop is shown an application 202 that assists visual describer in working with audio time compression device, which may be another software application, and incoming and outgoing audio streams. Application window 202 contains LC-VD BD 206 and pause button status display 210. The visual describer 108 can select the pause button 132 resulting in activation of pause status display 210 during the pausing and buffering of the live audio in live audio buffer 114 within audio time compression device 112. At the same time visual describer uses microphone 118 to insert visual description commentary. The entire time that visual describer is viewing video broadcast and inserting, or not inserting visual description, LC-VD BD will be continuously and instantaneously updated with the amount of live audio being buffered (i.e. seconds behind real time). Through this set up, visual describer can easily view the broadcast video, monitor the buffer, and control the entire system. Application 202 may also contain settings and other controls for controlling the audio time compression system 112, such as playback speed.

Figure 2B:
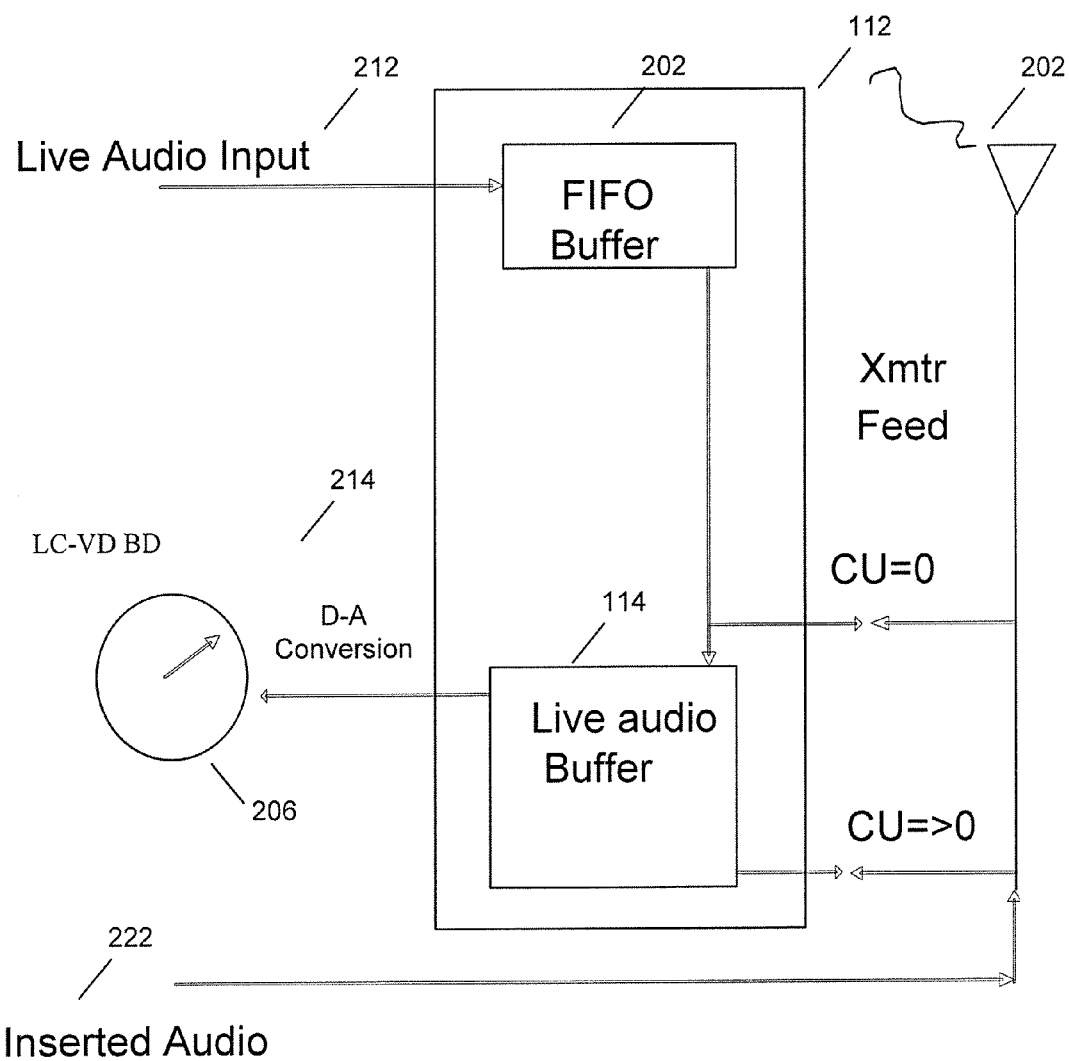
FIG. 2B shows a more detailed system view of the connection between visual describer, live audio, and live audio buffer.

FIG. 2B shows a more detailed system view of the connection between visual describer, live audio, and live audio buffer. Audio time compression device 112 is shown connecting together a live audio input 212, live chase video description buffer display (LC-VD BD) 206, and transmitter 202.

Live audio input 212 is live audio accompanying a video broadcast. This audio is fed into audio time compression device 112. It is stored within an input FIFO buffer 202 for further processing by audio time compression device. If the live audio buffer (catch up buffer) is empty, then this live audio can be routed directly from FIFO buffer 202 to output transmitter 202. If the live audio is currently being buffered, then the live audio in FIFO buffer can be buffered within live audio buffer 114 before being transmitted. Inserted audio annotations 222 from visual describer are outputted to transmitter 202 when live audio is being buffered. Together, the inserted audio annotations and live audio output from live audio buffer form an enhanced audio stream that is transmitted by transmitter 202.

Audio time compression device is also connected to LC-VD BD 206. This can be through an digital output 214 that goes through a digital to analog conversion (e.g. conversion of digital voltage level to an analog reference level) before being displayed, or alternatively, that is converted from one digital format to another before being displayed on a LC-VD BD with a digital input.

Alternatively, rather than being connected directly to output transmitter, inserted audio annotations can be connected to an input of the audio time compression device (or other device) to be combined together in a buffer for further processing before transmittal. Additionally, although shown as a separate system, audio time compression device 112 can be a part of visual describers system 116, for example, as a hardware or software component.

Figure 3A:
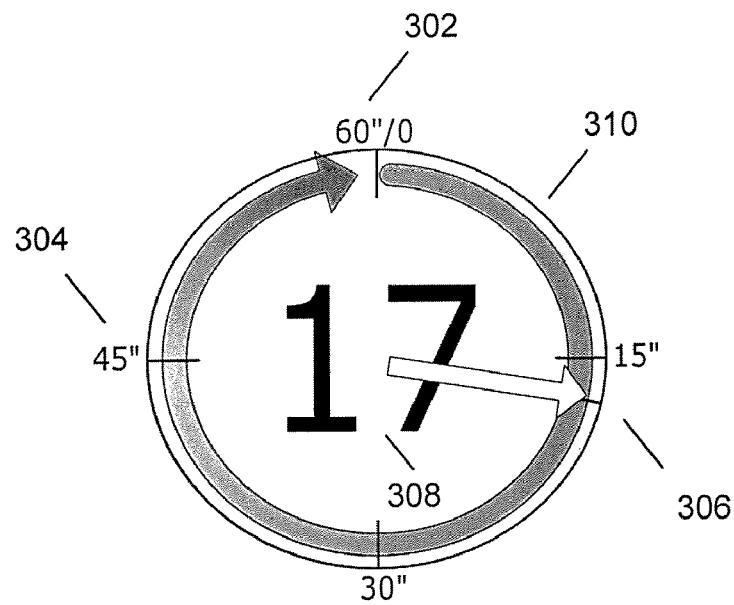
FIG. 3A shows a circular live chase video description buffer display (LC-VD BD) in accordance with one embodiment of the invention.

FIG. 3A shows a circular live chase video description buffer display (LC-VD BD) in accordance with one embodiment of the invention. LC-VD BD is shown in this embodiment as a circular display, calibrated is this example to a maximum time delay of 60 seconds 302. The circular display is colored or shaded 310 to give a more visual indication to the user, how close to the maximum time delay the instantaneous live audio buffer 114 is. LC-VD BD is also shown with incremental marks 304, and a current position indicator 306, showing exactly how much live audio have been buffered. This amount 308 is also shown in the center of the display.

This display is instantaneously updated with current location mark 304 sweeping around the circle in response to the live audio buffer status. It will increase as the pause button is being used and live audio is being buffered, and it will decrease as the audio time compression device plays back audio from the buffer at an increased speed.

Figure 3B:
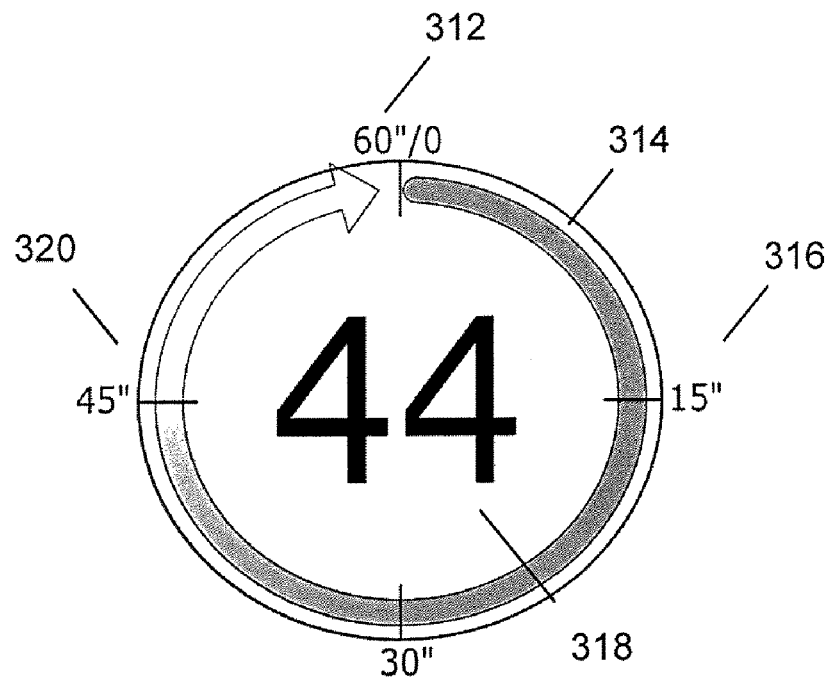
FIG. 3B shows a circular LC-VD BD in accordance with another embodiment of the invention.

FIG. 3B shows a circular LC-VD BD in accordance with another embodiment of the invention. This embodiment of the LC-VD BD is similar to the one shown in FIG. 3A and it has a maximum time delay 312, shading 314, position increments 316, and numeric amount display 318. This embodiment shows current position 320 using shaded or unshaded portions of the circular display. FIG. 3B shows that approximately 44 of live audio have been buffered.

Figure 3C:
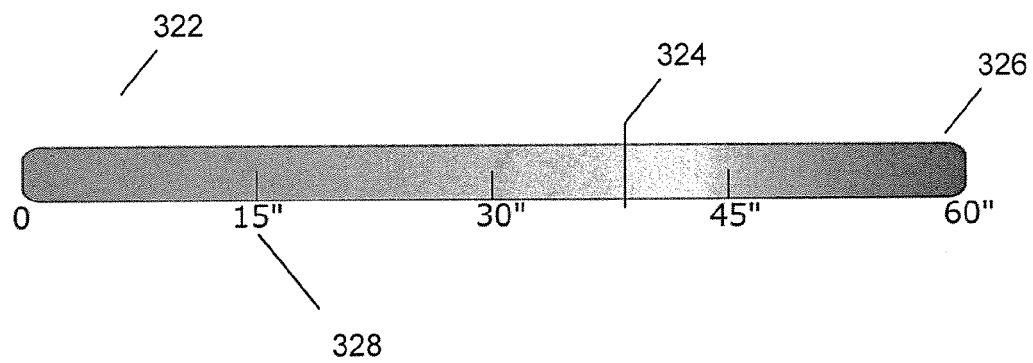
FIG. 3C shows a horizontal bar style LC-VD BD in accordance with another embodiment of the invention.

FIG. 3C shows a horizontal bar style LC-VD BD in accordance with another embodiment of the invention. This embodiment of the LC-VD BD is similar to the one shown in FIG. 3A and it has a maximum time delay 326, shading 322, position increments 328, and current position mark 324.

Figure 3D:
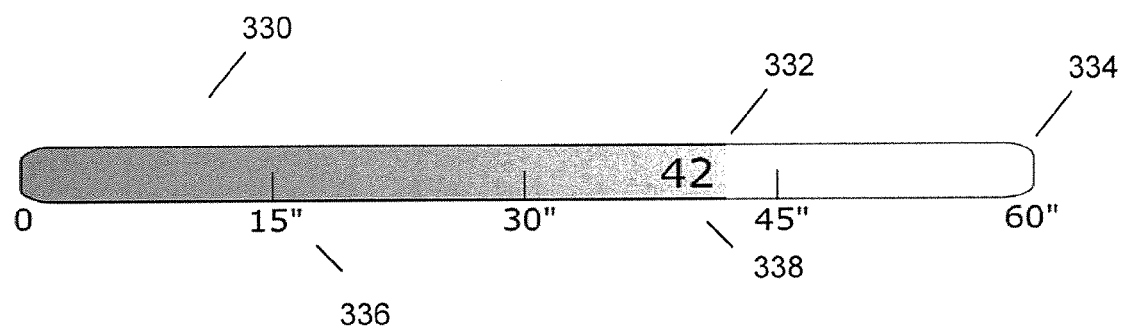
FIG. 3D shows a horizontal bar style LC-VD BD in accordance with another embodiment of the invention.

FIG. 3D shows a horizontal bar style LC-VD BD in accordance with another embodiment of the invention. This embodiment of the LC-VD BD is similar to the one shown in FIG. 3A and it has a maximum time delay 334, shading 330, and position increments 336. To show the current position within the audio buffer this embodiment uses shaded or unshaded portions 332 (similar to FIG. 3B) as well a numeric display 338 (similar to FIG. 3A) to mark the current position.

Figure 3E:
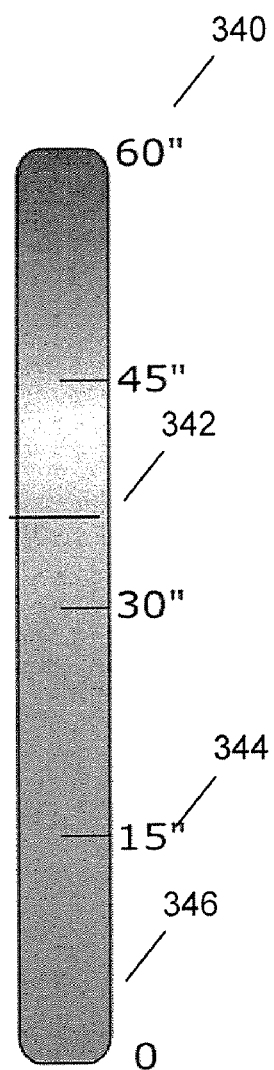
FIG. 3E shows a vertical bar style LC-VD BD in accordance with another embodiment of the invention.

FIG. 3E shows a vertical bar style live chase video description buffer display (LC-VD BD) in accordance with another embodiment of the invention. This embodiment of the LC-VD BD is similar to the one shown in FIG. 3A and it has a maximum time delay 340, shading 346, position increments 344, and current position mark 342.

Figure 3F:
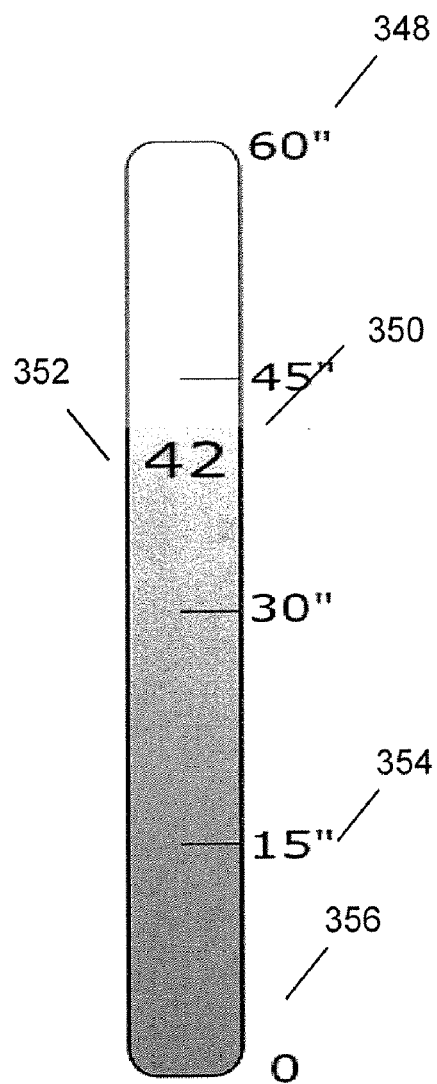
FIG. 3F shows a vertical style LC-VD BD in accordance with another embodiment of the invention.

FIG. 3F shows a vertical style live chase video description buffer display (LC-VD BD) in accordance with another embodiment of the invention. This embodiment of the LC-VD BD is similar to the one shown in FIG. 3A and it has a maximum time delay 348, shading 356, and position increments 354. To show the current position within the audio buffer, this embodiment uses shaded or unshaded portions 350 (similar to FIG. 3B) as well a numeric display 352 (similar to FIG. 3A) to mark the current position.

Figure 3G:
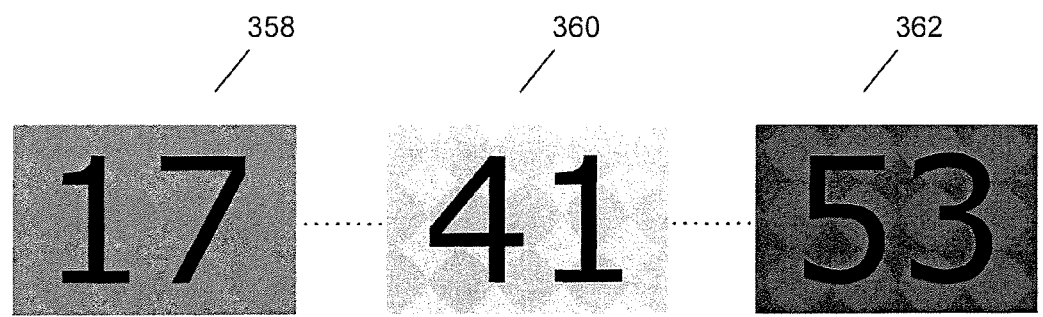
FIG. 3G shows a counter style LC-VD BD in accordance with another embodiment of the invention.

FIG. 3G shows a counter style live chase video description buffer display (LC-VD BD) in accordance with another embodiment of the invention. FIG. 3G shows an embodiment of the LC-VD BD where the size of live audio buffer is shown only by a number amount within a colored or shaded box. This example shows three different colors depending on how close the live audio buffer is to the maximum calibrated amount (358-not close, 360-somewhat close, and 362-very close). As the live audio buffer size increases, the visual display will jump between different colors. Additionally, a separate color can be used to indicate that the buffer size is greater than a pre-set limit.

Figure 3H:
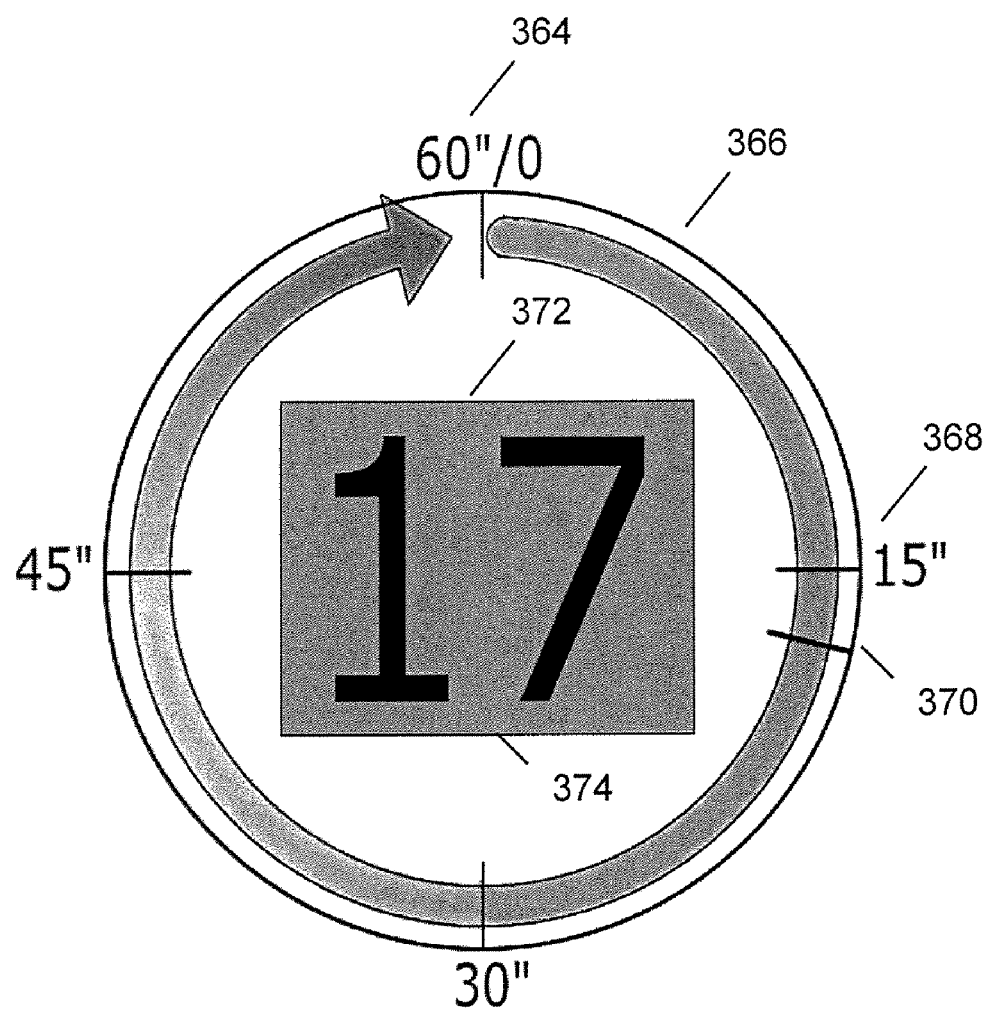
FIG. 3H shows a combination counter and circular style LC-VD BD in accordance with another embodiment of the invention.

FIG. 3H shows a combination counter and circular style live chase video description buffer display (LC-VD BD) in accordance with another embodiment of the invention. FIG. 3H is a combination of the display of FIGS. 3A and 3G and shows a maximum calibrated amount 364, a shaded portion 366 for visual assistance, and position increments 368. This current size of live audio buffer 114 is shown in multiple ways in this embodiment in order to communicate as easily as possible this information to visual describer. The display shows a current position mark 370, a numeric amount 374, and corresponding not close, somewhat close, and very close shading 372.

Figure 4:
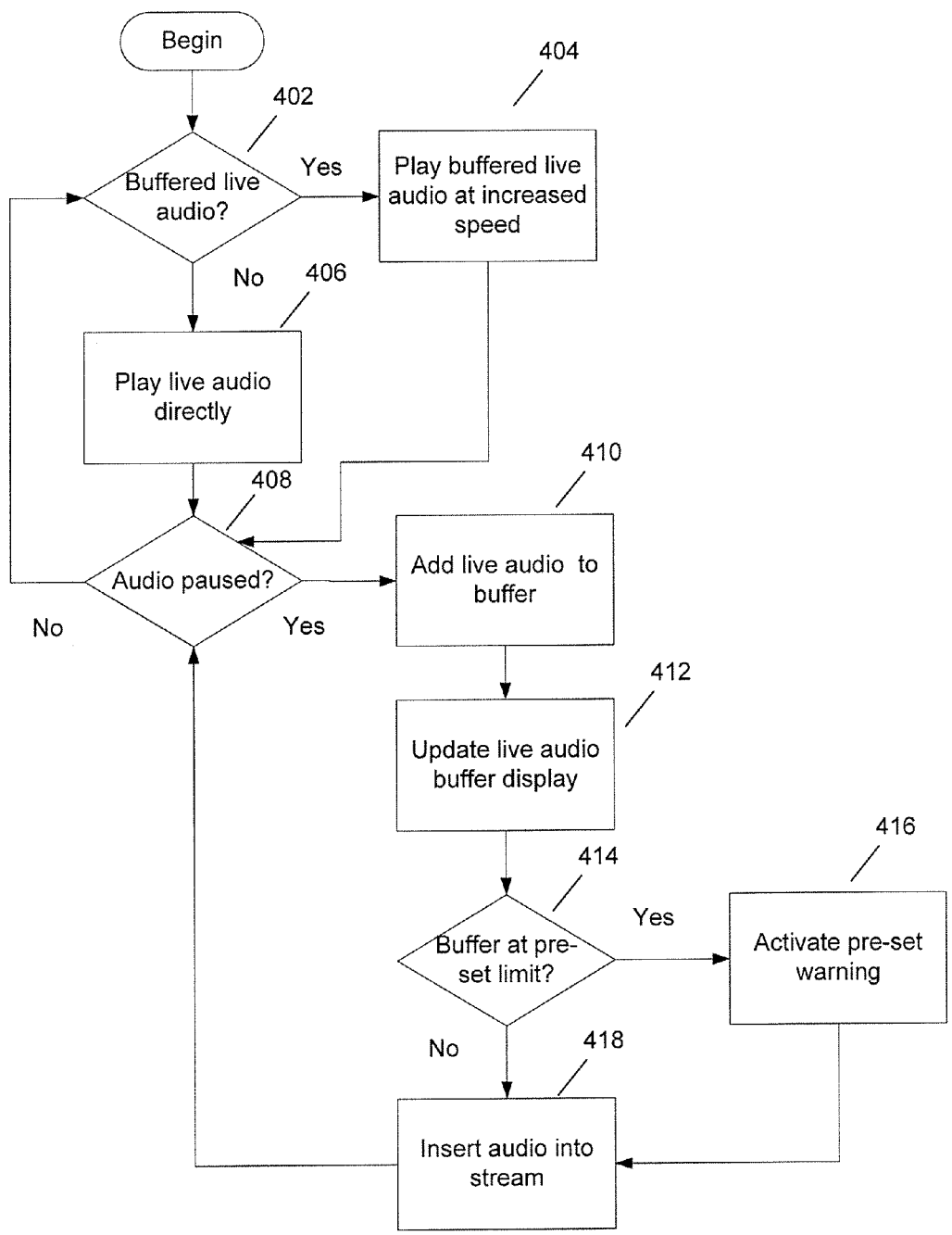
FIG. 4 is a flow diagram showing the process for visually describing a live event using an audio time compression device.

FIG. 4 is a flow diagram showing the process for visually describing a live event. In general, the live audio is directly played until the visual describer pauses it and inserts visual description. At this point, the live audio is stored in the buffer until the visual description ends, at which point, the system plays back audio from the buffer at a higher speed. The LC-VC BD is continually updated and shown to the visual describer. In the event the buffer reaches or exceeds the maximum calibrated amount, a warning can be shown to the visual describer in a variety of means, as illustrated in the accompanying figures with red status depictions. This process can be performed by appropriate application software on computer system 116, or a combination of hardware and software, including separate specialized audio and signal processing equipment. The playback of buffered live audio and visual description forms an enhanced audio stream which can be received by listeners, and used to accompany video broadcasts they may be tuned to.

At step 402, the system checks for buffered audio, and if present, plays it at an increased speed at step 404. If no buffered live audio is present, live audio can be played directly from the video broadcast at step 406. Playback can mean that the audio is prepared, buffered, or otherwise sent to another hardware or software component for further processing or actual transmission on a communication link.

Next, the system checks at step 408 to see if the audio has been paused by the visual describer, so that visual description can be inserted into the audio stream. At step 410, the visual describer system, including audio time compression system 112, starts buffering live audio. The LC-VD BD is updated at step 412 with the current status of the live audio buffer.

The system, such as application 202 checks if the live audio buffer 114 is at the maximum calibrated amount (e.g. 60 seconds, or a pre-set amount as selected by the user, or as the circumstances of the emergency or other event dictates). A pre-set warning can be activated and shown to the user at step 416 if the buffer is past the maximum pre-set limit. This pre-set warning can be a change in color of the visual buffer display.

Additionally, once the pre-set live audio buffer size has been reached, the audio time compression can be directed (automatically or manually) to increase the speed at which the buffered live audio is played. For example, although buffer live audio may normally be played back 5% faster, once the pre-set limit is reached, it may be played back 20% faster, even though audio artifacts may result.

At 418, the visual describer speaks into the microphone or otherwise inserts visual description into the audio stream.

The system can then check if the audio is still being paused, and can continue to let visual description be inserted in the audio stream. When the system is not paused, or buffering is not being played back at increased speed, the process returns to step 402 so that the live audio can be played via step 406. Although not shown, the process ends normally when the video broadcast ends, and no more audio is being provided, or when all audio within the live audio buffer has been played.

Figure 5:
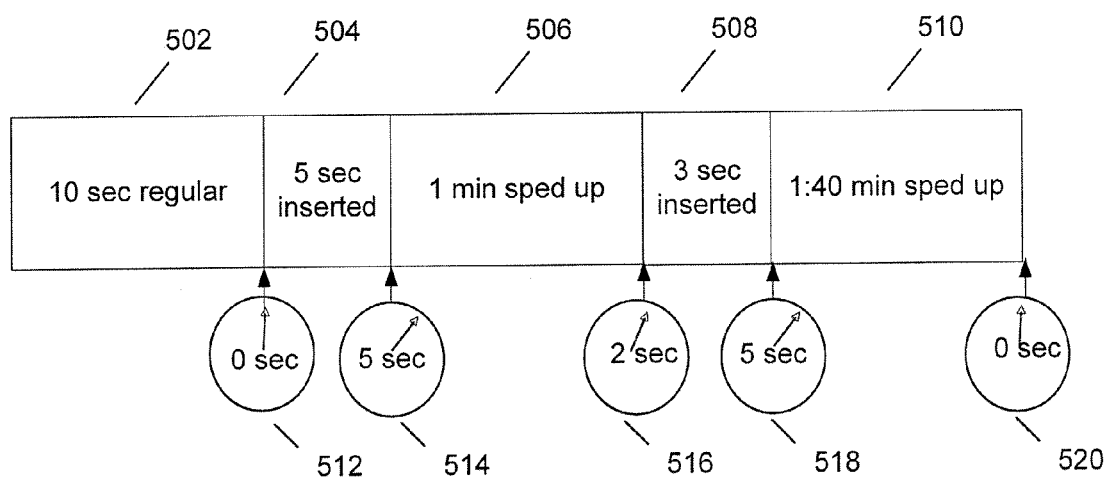
FIG. 5 is a graphics representation the audio stream generated by visually describing a live event when using an audio time compression device.

FIG. 5 is a graphic representation of the enhanced audio stream generated by adding visual description to live event audio. This graphic representation shows an enhanced audio stream (i.e. one containing visual description) into which two visual descriptions of 5 and 3 seconds have been inserted (not to scale). Also shown is the LC-VD BD buffer display amount (the number of seconds behind live).

This stream shows 10 seconds of audio 502 played at regular speed. The LC-VD BD shows 0 seconds behind live at this point. Following this is a 5 second 504 section of visual description that has been inserted. The LC-VD BD now shows 5 seconds 514 behind live. Following this is 1 minute 506 at an increased playback speed. The assumption is the playback speed is 5% faster than real time (selectable at operator discretion depending on needs and tolerance for compression artifacts). Consequently, the LC-VD BD now shows 2 seconds behind live (each 20 seconds of increased speed catches up 1 second). Through the audio time compression device, 3 seconds were saved by the increased speed over a 1 minute period. In this way, a listener can still hear all the original content along with the inserted visual description.

Following this is another 3 seconds 508 of visual description. The LC-VD BD again shows 5 seconds behind live. Following this is 1:40 seconds of increased speed playback 510, resulting in the live audio buffer being completely played and the system returning back to directly playing the live audio. The LC-VD BD shows 0 seconds behind live 520 at this point.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A method of generating an enhanced audio stream comprising:
   (a) receiving live audio accompanying a live video broadcast;
   (b) buffering the live audio in a buffer;
   (c) inserting into the enhanced audio stream at least a portion of the live audio;
   (d) inserting into the enhanced audio stream at least one visual description of the video broadcast while simultaneously displaying an instantaneously updated visual buffer size display that indicates the amount of live audio buffered in the buffer while the at least one visual description of the video broadcast is inserted into the enhanced audio stream, wherein the visual buffer size display is calibrated to a pre-set maximum buffer size, and wherein the visual buffer size display shows the pre-set maximum buffer size and the current buffer size in a visual manner; and
   (e) inserting into the enhanced audio stream, live audio from the buffer, wherein the live audio is compressed in time.

2. The method of claim 1, wherein the live video broadcast relates to a public emergency situation.

3. The method of claim 1, wherein the pre-set maximum buffer size is set to 60 seconds.

4. The method of claim 1, wherein the current buffer size is visually displayed through a numeric display.

5. The method of claim 1, wherein the current buffer size is visually displayed through an indicator on at least one of a circular, horizontal, and vertical graph.

6. The method of claim 1, wherein a warning is displayed when the current buffer size is greater than the pre-set maximum buffer size.

7. The method of claim 1, wherein the live audio is further compressed in time when the current buffer size is greater than the pre-set maximum buffer size.

8. The method of claim 1, further comprising:
   (f) transmitting the enhanced audio stream to a radio receiver, wherein the transmission is synchronized with the live video broadcast.

9. The method of claim 1, further comprising providing the enhanced audio stream along with the live video broadcast.

10. The method of claim 8, wherein the radio receiver is a digital radio receiver.

11. The method of claim 1, wherein the at least one visual description of the video broadcast comprises a user description from a user observing the video broadcast.

12. The method of claim 11, wherein the user description comprises audio content.

13. The method of claim 12, wherein the audio content comprises a description spoken by the user.

14. The method of claim 1, wherein the current buffer size shown by the visual buffer size display comprises a length of time indicating an amount of delay behind real-time.

15. The method of claim 1, wherein the visual buffer size display switches from showing a first color to showing a second color when the current buffer size becomes greater than a pre-set limit.

16. The method of claim 15, wherein the pre-set limit is the pre-set maximum buffer size.

17. A system for generating an enhanced audio stream comprising:
   an audio input for receiving live audio accompanying a live video broadcast;
   a memory buffer for storing the live audio;
   a microprocessor executing instructions for inserting into a memory location storing an enhanced audio stream, at least a portion of the live audio, and instructions for inserting into the memory location storing an enhanced audio stream at least one visual description of the video broadcast;
   an output display showing an instantaneously updated visual buffer size display that indicates the amount of live audio stored in the memory buffer while the at least one visual description of the video broadcast is inserted into the memory location storing an enhanced audio stream, wherein the visual buffer size display is calibrated to a pre-set maximum buffer size, and wherein the visual buffer display shows the pre-set maximum buffer size and the current buffer size in a visual manner; and the microprocessor executing instructions for storing at the memory location of the enhanced audio stream, live audio from the buffer, wherein the live audio is compressed in time.

18. The system of claim 17, wherein the current buffer size is visually displayed through a numeric display.

19. The system of claim 17, wherein the current buffer size is visually displayed through an indicator on at least one of a circular, horizontal, and vertical graph.

20. The system of claim 17, wherein a warning is shown on an output display if the current buffer size is greater than the pre-set maximum buffer size.

21. The system of claim 17, further comprising: an output communication link for transmitting at least a portion of the memory location storing the enhanced audio stream to a radio receiver, wherein the transmission is synchronized with the live video broadcast.

22. The system of claim 21, wherein the radio receiver is a digital radio receiver.

23. The system of claim 17, wherein the live audio is further compressed in time when the current buffer size is greater than the pre-set maximum buffer size.

24. The system of claim 17, further comprising a communication link for providing the enhanced audio stream along with the live video broadcast.

25. The system of claim 17, wherein the at least one visual description of the video broadcast comprises a user description from a user observing the video broadcast.

26. The method of claim 25, wherein the user description comprises audio content.

27. The method of claim 26, wherein the audio content comprises a description spoken by the user.

28. The method of claim 17, wherein the current buffer size shown by the visual buffer size display comprises a length of time indicating an amount of delay behind real-time.

29. The method of claim 17, wherein the visual buffer size display switches from showing a first color to showing a second color when the current buffer size becomes greater than a pre-set limit.

30. The method of claim 29, wherein the pre-set limit is the pre-set maximum buffer size.

* * * * *

UNITED STATES PATENT AND TRADEMARK OFFICE
CERTIFICATE OF CORRECTION

| | | |
|---|---|---|
| PATENT NO. | : 8,374,479 B1 | Page 1 of 1 |
| APPLICATION NO. | : 11/934728 | |
| DATED | : February 12, 2013 | |
| INVENTOR(S) | : Starling | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1206 days.

Signed and Sealed this
Twenty-third Day of December, 2014

Michelle K. Lee
*Deputy Director of the United States Patent and Trademark Office*